(12) United States Patent
Liu

(10) Patent No.: US 12,123,716 B2
(45) Date of Patent: *Oct. 22, 2024

(54) APPARATUS OF INNER LIGHT LAYER ILLUMINATION BY MULTI-BEAM INTERFERENCE FOR IMAGING IN TURBID MEDIA

(71) Applicant: Shangqing Liu, Toronto (CA)

(72) Inventor: Shangqing Liu, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/237,911

(22) Filed: Aug. 25, 2023

(65) Prior Publication Data

US 2024/0085168 A1 Mar. 14, 2024

Related U.S. Application Data

(63) Continuation of application No. 17/169,394, filed on Feb. 5, 2021, now Pat. No. 11,808,568.

(51) Int. Cl.
*G01B 9/02* (2022.01)
*G02B 26/08* (2006.01)
*G02B 26/10* (2006.01)

(52) U.S. Cl.
CPC ..... *G01B 9/02041* (2013.01); *G02B 26/0816* (2013.01); *G02B 26/101* (2013.01)

(58) Field of Classification Search
CPC .... G01B 9/02041; G01B 17/06; G01B 11/24; G02B 26/0816; G02B 26/101; G02B 21/0032; G02B 21/0056; G02B 27/1006; G02B 27/1066; G01N 21/4795
See application file for complete search history.

(56) References Cited

U.S. PATENT DOCUMENTS

| 2010/0082019 | A1* | 4/2010 | Neev | A61B 18/203 604/23 |
| 2013/0083816 | A1* | 4/2013 | Kubo | G02B 21/0076 372/25 |
| 2019/0369377 | A1* | 12/2019 | Tamano | G02B 21/0076 |
| 2022/0258277 | A1* | 8/2022 | Liu | B23K 26/0652 |

* cited by examiner

*Primary Examiner* — Hwa Andrew Lee

(57) ABSTRACT

The invention relates to an apparatus of inner light layer illumination for optical imaging in turbid media. This apparatus comprises laser generating short light pulse(s), negative dispersion device to broaden the width of the short light pulse(s) before the pulse(s) enter(s) the turbid medium, imaging distance adjuster changing the imaging distance and optical receiver receiving returned signal light pulse(s). This apparatus can reduce absorption and scattering of the turbid media greatly and create an inner light layer with strong intensity to illuminate the object in the turbid medium. The mathematical calculations have proved that this apparatus can enhance the signal strength by more than 600 dB. The imaging depth can be over 5 cm in human body, and more than 500 m in clear seawater. The imaging resolutions are <1 micrometer along object plane and are approximate 1 micrometer along direction of depth of field.

10 Claims, 8 Drawing Sheets

APPARATUS OF INNER LIGHT LAYER ILLUMINATION BY MULTI-BEAM INTERFERENCE FOR IMAGING IN TURBID MEDIA

STATEMENT

This specification is a duplicate of a prior specification in a prior application titled "Method of Inner Light Layer Illumination and Apparatuses by Multi-beam Interference for Imaging in Turbid Media". The application number of the prior application is Ser. No. 17/169,394, which was filed on Feb. 5, 2021. This specification is for being the specification of a continuation application of its prior (parent) application titled "Method of Inner Light Layer Illumination and Apparatuses by Multi-beam Interference for Imaging in Turbid Media" and having application number of Ser. No. 17/169,394. The only inventor and applicant of the prior application, Shangqing Liu, is the only inventor and applicant of this continuation application. Compared with its prior specification, no new matter is in this duplicated specification. This continuation application is for submitting claims and obtaining rights for apparatus designed using the method claimed by its prior (parent) application.

FIELD OF THE INVENTION

The present invention relates to imaging in turbid media, and more particularly, to an apparatus of inner light layer illumination by multi-beam interference for optical imaging in turbid media.

BACKGROUND OF THE INVENTION

Imaging in turbid media, including optical imaging, acoustic imaging and X-ray imaging, is widely and crucially needed in modern societies, such as medical imaging, underwater imaging, in-smog imaging, and material injury detection.

The imaging or detection in turbid media is extremely difficult compared with that in transparent media (e.g. in a clear atmosphere). These difficulties are mainly caused by strong absorption and scattering of turbid media, which attenuate optical or acoustic wave intensity for imaging or detection, and produce scattering noise to flood the imaging or detection signal.

Let's take medical optical imaging as the example to introduce absorption and scattering influences of turbid media. Optical imaging has special advantages in the field of medical imaging: it has higher resolution than acoustic imaging and X-ray imaging, and better safety than X-ray imaging (no adverse radiation impact on human tissues). The absorption and scattering of human tissues depend on the type of tissue, the tissue refractive index, the tissue frequency characteristic, etc. The absorption and scattering of human tissues are also affected by the unevenness of refractive index, and the shape, scale, density of scattering particles in tissues, etc. Therefore, they are complex functions of many parameters [see the references: E. M. C. Hillman, "Experimental and theoretical investigations of near infrared tomographic imaging methods and clinical applications," Thesis for the degree of Doctor, Department of Medical Physics and Bioengineering, University College London, February 2002; J. L. Sandell and T. C. Zhu, "A review of in-vivo optical properties of human tissues and its impact on PDT," J Biophotonics, 4 (11-12), 2011, pp. 773-'78'7]. These absorption and scattering will cause light intensity to rapidly decay. For example, when an near-infrared light beam ($\lambda=800$ nm) with intensity of 1 mw propagates in the human blood, under the dual actions of absorption and scattering, after a distance of 25 mm, the beam intensity attenuates to below $7\times10^{-19}$ mw. That is, the beam intensity attenuates to less than three photons per second. Of course, increasing the incident beam intensity will increase the number of remaining photons, which will increase the final intensity of the signal received. However, the high incident intensity will damage the human tissues.

Underwater imaging, such as those in the seas or in generally more turbid inland rivers and lakes, also faces similar problems, although its absorption and scattering effects vary in scale. Because high frequency sound waves attenuate too fast in the water, the effective imaging distance is too short, while the imaging resolution of the median or low frequency sound wave is too low, so the underwater acoustic imaging has no practical significance, and optical imaging is used for underwater imaging mainly. The absorption and scattering of the turbid water also depend on the specific water conditions, including the composition and proportion of dissolved contents and suspended contents, the frequency characteristic of the water refractive index, the shape, scale and density of scattering particles, etc, and even the depth of water (as the composition or density of suspended particles vary with depth). Therefore, they are also the complex functions of multiple parameters [see the references: C. D. Mobley, "The Optical Properties of Water," Chapter 43, Handbook of Optics, Vol. I, 2ed, edited by M. Bass, et al, McGRAW-Hill, New York, 1995, pp. 43.1-43.56; W. Hou, "Active Underwater Imaging," Chapter 4, Ocean Sensing and Monitoring: Optics and Other Methods, SPIE Press Book, 2013, pp. 87-93]. These absorption and scattering can also cause rapid attenuation of light intensity. For example, even in clear seawater, the green light ($\lambda=550$ nm), which has good transmittance in water, can only travel as far as 25 m. At present, the longest underwater imaging distance is 4.6 m to 7.6 m, and in order to reduce the backscatter light noise, the illumination source must be separated from the camera and placed close to the object.

A great effort has been made and is continuously being made in the research and development fields of imaging and detection in the turbid media, and many achievements have been obtained. These achievements have given great benefits to human society. Taking medical imaging as an example, because of visualization, non-invasion and reliability, X-ray examination, X-ray computer tomography, ultrasound inspection, etc. have become the most basic and widely depended tools in the field of medical diagnosis, and in fact these medical imaging apparatuses have become basic and indispensable equipments to support the modern medical system, which play great roles for the health and life of millions of people every day.

Although the research and development of medical optical imaging started late, a variety of technologies and apparatuses have already emerged, including the unique technology of optical coherence tomography [see the reference: J. F. D. Boer, R. Leitgeb and M. Wojtkowski, "Twenty-five years of optical coherence tomography: the paradigm shift in sensitivity and speed provided by Fourier domain OCT," Biomedical Optics Express, Vol. 8, No. 7, 2017, pp. 3248-3280]. However imaging in the high turbid media (such as in the human body) is extremely difficult, so at present the imaging or detection depth is still limited, including optical coherence tomography. The confirmed deepest imaging depth is less than 1 cm. But even with a few millimeters of imaging depth, these optical three-dimensional (3D) imaging apparatuses are playing an important role in the diagnosis and treatment of ophthalmology, dentistry and dermatology, and so on, and have achieved excellent results.

In the field of medicine, optical imaging has higher imaging resolution than ultrasound imaging (optical imaging: 0.1 μm-1 μm, optical coherence tomography imaging: 1 μm-10 μm, high frequency ultrasound imaging: 10 μm-100 μm), and has better safety and higher imaging resolution than X-ray imaging (X-ray CT scan or magnetic resonance imaging: 100 μm-1000 μm) [see the reference: J. K. Barton, Biomedical Optics, Department of Biomedical Engineering, The University of Arizona, Tucson, AZ, 2015]. Therefore, because the thickest depth of human body (chest) is about 40 cm, if the depth of optical imaging can be more than 20 cm, the optical imaging for the full body (from two sides of the body respectively) can be achieved. In this way, optical apparatus can replace ultrasound and X-ray apparatuses, and become a new generation of basic medical equipment with high imaging resolution and high radiation safety to support the modern medical system.

In the field of underwater imaging, the distance of less than 8 m greatly limits human underwater activities as it seriously impedes human vision even in the clear seawater. The water becomes the best natural barrier to easily hide anything, including objects that move freely in its interior. People have hoped to make substantial progress in this field, and to break through this natural barrier (to some extent) for a long time.

BRIEF SUMMARY OF THE INVENTION

The aim of this invention is to design an apparatus based on using a method of imaging and detection in turbid media with significantly increased imaging and detection distances. After much thought and repeatedly solving key problems emerged, a novel method of inner light layer illumination for optical imaging and detection in turbid media has been successfully created and the apparatuses based on the invented method have been designed. This method and designed apparatuses can simultaneously reduce the absorption and scattering of turbid media largely, resulting in great increase of the imaging or detection distance. The theoretical analyses and mathematical calculations have proved that this method is practicable and the designed apparatuses have great performance. By using this method and apparatuses, the signal strength of optical imaging or detection is much greater than that obtained by traditional technology, and the enhancement of the signal light intensity can be more than 600 dB with possibility to reach 2000 dB. The optical imaging depth in human body (in human blood) is more than 5 cm with possibility to reach 20 cm. The optical imaging distance in clear seawater is more than 100 m with possibility to reach 2000 m.

The said method of inner light layer illumination is originated from such an idea: in the light beam propagation paths (including the illumination path and signal return path), the turbid media produce light absorption and scattering, which attenuate the intensities of the illumination and signal beams, and also produce light noises to bury the return signal light. Therefore, one needs to find a method to make the light beam disappear in the illumination path and so without being absorbed and scattered, and only appear near the object and so only to illuminate the object in the turbid media, then to make the signal light disappear again in the return path and so without being absorbed and scattered too, and only appear at the observation position to be received. Although this dreamy method can't be realized, it can be achieved very proximately by utilizing multi-beam interference.

The specific implementation way is as follows: first, to use a dispersion generation device to broaden the width of a short or ultra-short light pulse, that is, to utilizing dispersion to make various frequency components of a short or ultra-short light pulse create multi-beam destructive interference. Thus, the peak intensity of the pulse is greatly reduced, and the pulse becomes a beam group with low or very low composite light intensity. Then this beam group enters the turbid medium. When this beam group travels in the turbid medium, because of its low or very low composite intensity, the light absorption and scattering caused by the medium are also small or very small since the light absorption and scattering are directly proportional to the light intensity. The turbid medium also produces dispersion to the incident light beam group. If the value of the dispersion generated by the dispersion generation device is equal to the value of the dispersion generated by the turbid medium within the path reaching the object, but with the opposite sign, the light pulse broadened by the dispersion generation device will be compressed by the turbid medium, and becomes a short or ultra-short pulse again just near the object by multi-beam constructive interference. Thus, the expected inner light layer is formed to illuminate the object in the turbid medium.

The said method of inner light layer illumination for optical imaging and detection in turbid media comprises: using a negative dispersion generation device to broaden the full width of half maximum of a short or ultra-short light pulse; then making the broadened light pulse enter the turbid medium, and also utilizing positive dispersion of the turbid medium to compress the broadened light pulse in the propagation path; and at a designed position to create a short or ultra-short light pulse again to illuminate the object in the turbid medium; the short or ultra-short signal light pulse reflected by the object returns along the incident path reversely, during the return path, the full width of half maximum of the signal light pulse is broadened by positive dispersive turbid medium again; then, the broadened signal light pulse is compressed by negative dispersion generation device; and at last the broadened signal light pulse becomes short or ultra-short signal light pulse again and is received by imaging or detection receiver placed at the image receiving position.

The said method of inner light layer illumination (ILLI) for optical imaging and detection in turbid media is described in more detail underneath.

To select N polarized light beams with different angle frequencies $\omega_j$ (j=0, 1, 2, ..., N), which have the same or approximately the same amplitudes and the same or approximately the same polarization states. The angular frequency intervals $\Delta\omega$ of any two frequency adjacent beams in these N beams are the same or not the same, here supposing the intervals $\Delta\omega$ are the same for simplifying the related analyses and calculations. In addition, at a certain moment t the initial phases $\phi_j$ (j=0, 1, 2, ..., N) of these N beams are zero. The output beams from mode-locked laser and if their polarization directions are polarized by a polarizer satisfy these conditions [see the reference: P. W. Smith, "Mode-Locking of Laser," Proc. IEEE, 58(9), 1342-1355, 1970].

The light fields of these N beams are superimposed to each other on the propagation path first in the negative dispersion generation device and then in the turbid medium, which produce multiple beam interference. The negative dispersion generation device has negative dispersion and the turbid medium has positive dispersion (in the most situations, the optical media have positive dispersions). Thus, because these beams have different frequencies and different phase velocities, the destructive interference of the multiple beams makes the composite amplitude of N beams very small in the most of the propagation paths, so the composite light intensity of N beams is attenuated in the propagation path. Generally, a large number N should be chosen to make the composite light intensity attenuate to an expected small value. N may be from 3 to $10^{12}$ or more (see further description below).

Also because of the dispersion, the phase differences between any two frequency adjacent beams change gradually. Since the angular frequency intervals $\Delta\omega$ between any two frequency adjacent beams are the same, and the initial phases $\phi_j$ (j=0, 1, 2, ..., N) of these N beams are zero at a previous moment, the phase differences between any two frequency adjacent beams may gradually change from zero to certain large values first in the negative dispersion generation device first, and then from certain large values to zero in the positive dispersion medium next, and at a designed position in the turbid medium, the phase differences between any two frequency adjacent beams all become zero or approximately zero at the same time, resulting in constructive interference of the N beams. That is, the amplitudes of the N beams add to each other coherently, and create composite light intensity maximum. If the number N is large enough, the composite light intensity maximum may increase to an expected large value, and the duration of the composite light intensity maximum may reduce to an expected short value. Therefore, a thin inner light layer in the medium is formed.

Therefore, the said method of inner light layer illumination (ILLI) for optical imaging and detection in turbid media will have the following great properties:

1. In most sections of the propagation path, the composite intensity of the N light beams is not only far less than the intensity sum of N incident beams, but also less than the intensity of any one beam in the N beam group, because the absorption and scattering of the turbid media are proportional to the intensity of the incident light beam, so the absorption and scattering of the turbid media are greatly reduced. This will not only greatly reduce the transmission attenuation of the light energy, leading to more light energy to illuminate the object, but also greatly reduce the light noise caused by scattering, thus effectively improving the signal to noise ratio of the imaging or detection.
2. The object is placed at the position of the composite light intensity maximum. The composite light intensity maximum is not only much higher than the intensity of any one beam in the N beam group, but also is higher than the intensity sum of the N incident beams. Because the reflected light intensity is proportional to the illumination light beam intensity, when the illumination light is reflected by the object and becomes the return signal light, the signal light intensity will be further increased largely.
3. The return signal light is still mainly composed of the N incident light beams. Although their amplitudes are significantly or even inconsistently attenuated, and their polarization states are changed or even inconsistently changed, as long as these inconsistencies are not very serious (as in most cases), the return propagation of the signal light from the object may be a completely reverse process of N incident light beams to the object (if the signal light returns along the incident path).

Therefore, according to the light ray reversible principle [see the reference: D. S. Goodman, "General principles of Geometric Optics," Handbook of Optics, Vol. I, 2ed, Edited by M. Bass, and et al, McGRAW-Hill, New York, 1995, p. 1.10], the multiple beam interference can still occur in the return path, resulting in composite light intensity attenuation in most sections of the return path, and composite light intensity maximum appearing only at a specific position. This may greatly reduce the absorption and scattering of the turbid media in the return path, preserve the return signal energy and reduce the light scattering noise again. Usually, the imaging or detection receiver is placed at the position of composite light intensity maximum of the return signal light. Sometimes, the signal light travels along a different path from the incident path to the imaging or detection receiver. If the required conditions for multiple beam interference may be satisfied too, the destructive interference will also make absorption and scattering of the turbid media small in the signal propagation path, and the constructive interference will make the signal light be received well too.

The imaging or detecting signal produced by the said N beams is pulse signal. Generally, the same beam groups having the same characteristics of the said N beams can be repeatedly used to produce a series of signal pulses, which can improve the total energy received by the imaging or detection receiver.

The said polarized light beams may be plane polarized, or elliptically polarized, or circularly polarized light beams, because the beams of plane polarized, elliptically polarized and circularly polarized all can produce interference. The said polarization states include polarization directions of the plane polarized light beams, ellipticity of the elliptically polarized light beams. The said N polarized light beams may be planar, or cylindrical, or spherical light beams. Since the planar light beams are used mainly for most applications, the underneath physical analyses and mathematical calculations are based on using planar light beams. For applications of using the cylindrical or spherical light beams, physical analyses and mathematical calculations can follow the similar processes.

Based on the said method, a new type of apparatus can be designed. These apparatuses comprise laser generating short or ultra-short light pulse which contains N polarized light beams with different frequencies but usually the same frequency intervals, the same or approximately the same polarization states, and zero initial phases at a certain moment; an optical adjusting means to make the amplitudes of N polarized light beams become the same or approximately the same; a negative dispersion generation device; an imaging distance adjuster to adjust the expected imaging distance in the turbid medium; a means to move the internal light layer, or point, or line in the turbid medium in three dimensions.

BRIEF DESCRIPTION OF THE DRAWINGS

The preferred embodiments of the apparatuses designed for realizing said method will be described underneath. Obviously, these embodiments are not all apparatuses which can be designed based on the said method. Based on the key principle of the invented method and using existing technical knowledge, the said method and the apparatus embodiments may be modified and alternated. Therefore, the applicant of this invention reserves the right of all modifications, alternatives, and equivalent arrangements of the invented method and the apparatus embodiments described underneath.

The aforementioned aspects and advantages of the invention will be appreciated from the following descriptions of preferred embodiments and accompanying drawings wherein:

In FIG. 1, the solid line, dashed line and dotted line represent planar wavefronts of the beams corresponding to the angular frequencies $\omega_0$, $\omega_j$ and $\omega_{N-1}$. When these three wavefronts travel in the positive dispersive turbid medium, since $\omega_0 < \omega_j < \omega_{N-1}$, the wavefront represented by the solid line travels fastest.

DETAILED DESCRIPTION OF THE INVENTION

Figure 1:
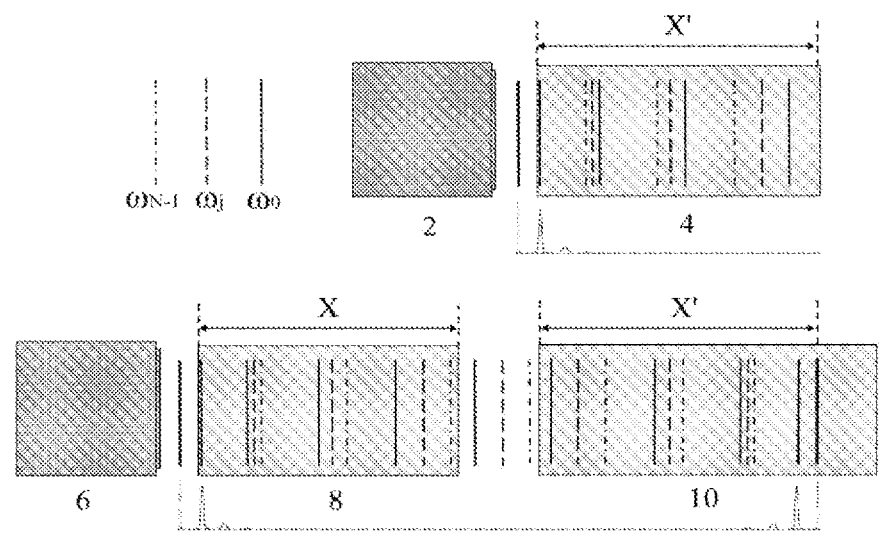
FIG. 1 illustrates a short light pulse is broadened by positive dispersion medium only (in the top), and is broadened by the negative dispersion generation device first and then is compressed by the positive dispersion medium next (in the bottom).

Selecting N light beams with same polarization directions and different angular frequencies $\omega_j$. The frequency intervals $\Delta\omega$ of these beams are the same, that is, $$\omega_j = \omega_0 + j\Delta\omega, \; j=0,1,2,3,\ldots,N-1, \quad (1)$$

Where $\omega_0$ is the lowest angular frequency within the frequency range of N beams. When these beams propagate along x direction, since these beams are superimposed, their composite field is [see the reference: P. W. Smith, "Mode-Locking of Laser," Proc. IEEE, 58(9), 1342-1355, 1970].

$$E(x,t) = \sum_{j=0}^{N-1} A_j(x) e^{i\left[\omega_j\left(t-\frac{x}{C}\right)+\varphi_j\right]} + C.C. \quad (2)$$

$j = 0,1,2,3,\ldots,N-1,$

Where $A_j$ and $\varphi_j$ are the amplitude and initial phase at x=0 and t=0 of the jth beam. t is the time. C is light speed in vacuum. C.C. represents the complex conjugate.

By making dispersion compensation to laser cavity gain using dye [see the reference: R. L. Woodward, "Dispersion engineering of mode-locked fiber lasers," J. Opt. 20, 033002, 2018], the distribution shape of the amplitudes $A_j(x)$ can be modified to become a square. Thus, $A_j(x)$ changes no longer with j. Then, when these beams enter an optical medium, since the propagation speed of the jth beam changes from C to $V_j=C/n_j$, where $n_j$ is the refractive index of the medium corresponding to the angular frequency $\omega_j$, the Eq. (2) becomes $$E(x,t) = A(x) \sum_{j=0}^{N-1} e^{i\left[\omega_j\left(t-\frac{xn_j}{C}\right)+\varphi_j\right]} + C.C. \quad (3)$$

$j = 0,1,2,3,\ldots,N-1.$

Defining $\Delta\phi_j$ as the phase difference between two beams corresponding to angular frequencies $\omega_j$ and $\omega_{j-1}$ then $$\Delta\phi_j = \omega_j\left(t - \frac{xn_j}{C}\right) + \phi_j - \omega_{j-1}\left(t - \frac{xn_{j-1}}{C}\right) - \phi_{j-1}, \quad (4)$$

$j = 0,1,2,3,\ldots,N-1.$

The N beams will interfere with each other constructively when $\Delta\phi_j=0$. Such a multi-beam constructive interference will create a composite light intensity maximum, that is, create a strong light pulse.

It is just the situation when a light pulse emitted from the mode-locked laser enters the input surface of a dispersive medium. Since the pulse contains N frequency components, that is, N light beams, the zero phase difference of any pair of two beams corresponding to the angular frequencies $\omega_j$ and $\omega_{j-1}$ (j=0, 1, 2, 3, ..., N−1) is kept when the pulse enters the input surface of the medium.

The dispersion of the air gap between the mode-locked laser and the medium is neglected because the dispersion of atmosphere is very small. Supposing the pulse enters the input surface of the medium at t=0, and the input surface of the medium is located at the position of x=0, thus, the initial phases $\varphi_j$ are zero at x=0 and t=0. The input surface is perpendicular to the x direction.

In the most situations, the optical media are positive dispersive media including human tissues and seawater. When the light pulse enters the positive dispersive medium, the different beams constituting the light pulse travel at different speeds. The higher the beam frequency is, the lower the beam travels. Thus, the pulse broadens and becomes a beam group with weaker and weaker composite light intensity as shown in the top of FIG. 1.

In FIG. 1, the light beams are from a mode-locked laser 2. The solid line, dashed line and dotted line represent planar wavefronts of the beams corresponding to the angular frequencies $\omega_0$, $\omega_j$ and $\omega_{N-1}$. If these three wavefronts travel in the positive dispersive turbid medium 4, since $\omega_0 < \omega_j < \omega_{N-1}$, the wavefront represented by the solid line travels fastest.

When these three wavefronts travel in a negative dispersion generation device 8, their traveling speeds are reversed, that is, the higher the beam frequency is, the faster the beam travels. The light beams are from mode-locked laser 6. If the light pulse enters the device 8 at t=0, three wavefronts are overlapped at the position x=0. In the device, since $\omega_0 < \omega_j < \omega_{N-1}$, the wavefront presented by the dotted line travels fastest.

Thus, $\Delta\phi_j$ will change with x from zero to negative value although $\omega_j > \omega_{j-1}$. If the propagation distance of the beam corresponding to the angular frequency $\omega_j$ is $x_j$ in the device, then, $$\Delta\phi_j = -\left[\omega_j\left(t - \frac{x_j n_j}{C}\right) - \omega_{j-1}\left(t - \frac{x_j n_{j-1}}{C}\right)\right], \quad (5)$$

$$j = 0,1,2,3, \ldots, N-1.$$

The destructive interference will occur and grow in the device 8 with change of $\Delta\phi_j$ from zero to negative value.

Note that the shorter the light pulse duration is, the faster the pulse broadens, and the quicker the pulse peak light intensity decreases. It is because the shorter pulse has a wider frequency range and contains more frequency components. If defining the decrease time length of the pulse peak intensity from 100% to a significantly small percentage, such as 0.1%, as the initial broadening period $T_{ib}$, outside the initial broadening distance $D_{ib}=V_a T_{ib}$, the light absorption and scattering will become significantly small because the light peak intensity has dropped significantly, where $V_a$ is the average speed of the N beams. The required initial broadening period $T_{ib}$ or the initial broadening distance $D_{ib}$ depends on the absorption and scattering coefficients of the medium. For the turbid medium with larger absorption or/and scattering, the required $T_{ib}$ or $D_{ib}$ should be shorter. For example, the $D_{ib}$ value should be of the scale of millimeters for medical imaging and of the scale of the meters for underwater imaging. In the same way, the last shortening period $T_{ls}$ is defined, which is the increase time length of the pulse peak intensity from a very small percentage, such 0.1%, of its maximum value to the 100% of its maximum value. Because the pulse shortening is the reverse process of the pulse broadening completely, $T_{ib}$ should be equal to $T_{ls}$ in the same optical medium.

After leaving the negative dispersion device 8, the broadened light pulse enters the positive dispersive turbid medium 10. The optical path difference of any pair of two frequency adjacent beams of the pulse decreases gradually in the turbid medium 10. The optical path difference between any two of the three wavefronts shown in FIG. 1 also decreases gradually. Thus, in other words, the light pulse broadening terminates, and the light pulse shortening begins.

Let the phase difference between two beams corresponding to angular frequencies $\omega_j$ and $\omega_{j-1}$ in the turbid medium be $\Delta\phi'_j$, and the propagation distance of the beam corresponding to angular frequency $\omega_j$ be $x'_j$ in the turbid medium, then, $$\Delta\phi'_j = \omega_j\left(t - \frac{x'_j n'_j}{C}\right) - \omega_{j-1}\left(t - \frac{x'_j n'_{j-1}}{C}\right), \quad (6)$$

$$j = 0,1,2,3, \ldots, N-1,$$

Where and $n'_j$ and $n'_{j-1}$ are refractive indexes of the turbid medium corresponding to the angular frequencies $\omega_j$ and $\omega_{j-1}$.

If the medium used in the device for generating the negative dispersion is the same medium as the turbid medium, or it has the same or very approximate dispersion property as the turbid medium, then, $n'_j=n_j$ and $n'_{j-1}=n_{j-1}$. Under this condition, if taking $x'_j=x_j$, we get $\Delta\phi'_j=-\Delta\phi_j$. Thus, because $\Delta\phi'_j-\Delta\phi_j=0$ for every pair of two frequency adjacent beams, the broadened light pulse will be compressed completely. A thin inner light layer will be formed in the turbid medium 10. Therefore, by making mirrored negative dispersion compensation, the expected thin inner light layer can be formed in the turbid medium.

DETAILED DESCRIPTIONS OF APPARATUSES DESIGNED BASED ON THE METHOD OF THE INVENTION

Figure 2:
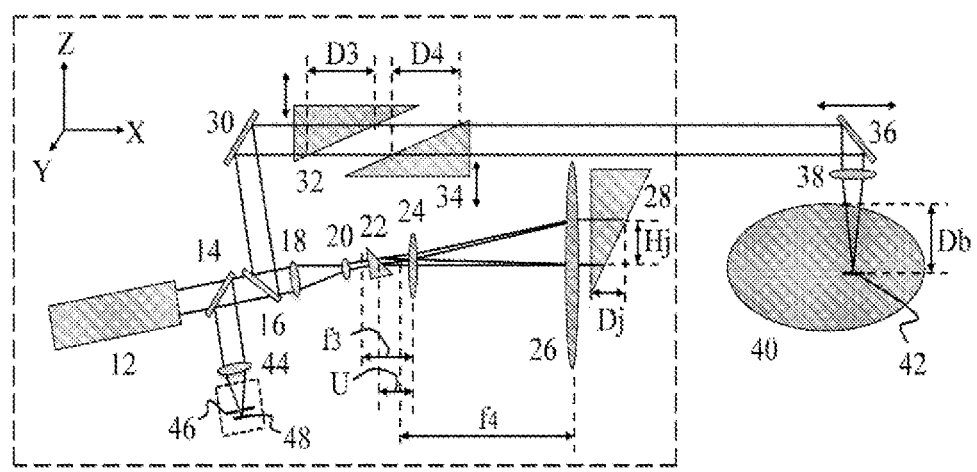
FIG. 2 illustrates the schematic diagram of optical structure of the medical imaging apparatus.

FIG. 2 illustrates the diagram of optical structure of the designed medical imaging apparatus.

The N polarized and parallel light beams come from a mode-locked laser 12. After passing through the beam splitter 14, 10% of the light energy enters the second beam splitter 16. The transmittance of the beam splitter 16 is 50%. Then, 5% of the total incident light energy enters two lenses 18 and 20 for beam shrinking and focusing. Using a beam splitter 14 with low transmittance is for less signal energy loss when the signal light is reflected by beam splitter 14 later. Then, the shrank and slight focused beams enter a right-angle prism 22 normally.

Figure 3:
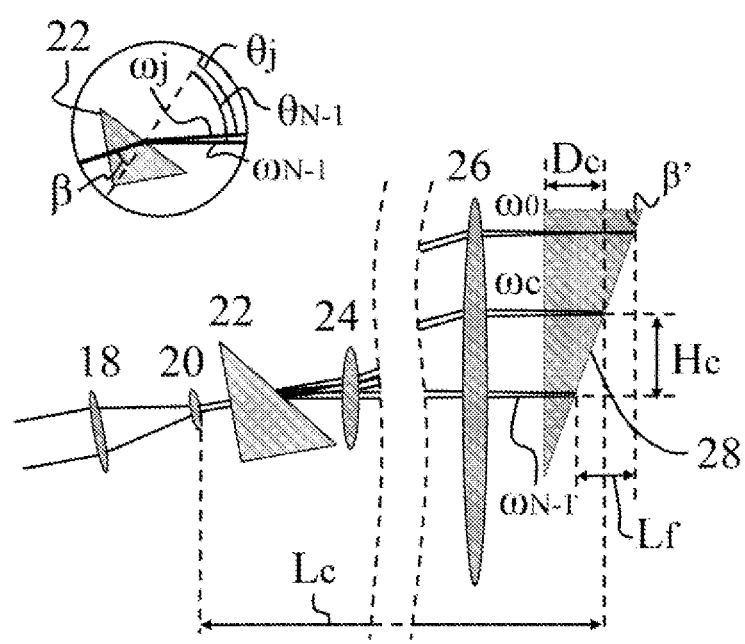
FIG. 3 illustrates the detailed sections of FIG. 2.

The vertex angle of the prism 22 is β, therefore, the incident angles of the central lines of the N thin and slight focused beams to the output surface of the prism 22 are β too (also see FIG. 3). When these beams are refracted by the prism 22, the refractive angle $\theta_j$ of the central line of the beam corresponding to angular frequencies $\omega_j$ is [see the reference: D. S. Goodman, "General principles of Geometric Optics," in Handbook of Optics, McGRAW-Hill, 1995, Vol. I].

$$n_j \sin \beta = \sin \theta_j, \quad (7)$$

where $n_j$ is the refractive index of the prism 22 corresponding to the angular frequency $\omega_j$, and the refractive index of atmosphere is ~1. After being refracted by the prism 22, all beams enter a thin lens 24. $f_3$ is the focal distance of lens 24. To simplify the analyses and calculations, the central line of the beam corresponding to the angular frequency $\omega_{N-1}$ is arranged along the optical axis of the lens 24 and through the center of the lens 24. The optical axis of the lens 24 is located on the X axis. U is the distance from the beam centers on the output surface of the prism 22 to the center of the lens 24. Since $U<f_3$, according to Newton equation for thin lens [see the reference: D. S. Goodman, "General principles of Geometric Optics," in Handbook of Optics, McGRAW-Hill, 1995, Vol. I], the angle of $\theta_{N-1}-\theta_j$, which is the angle between two central lines of the beams corresponding to the angular frequencies $\omega_{N-1}$ and $\omega_j$, is magnified by M times to $\theta'_j$ (see FIG. 3), that is $$\theta'_j = M(\theta_{N-1}-\theta_j). \quad (8)$$

Where $M=f_3/(U-f_3)$. When M is negative, the image is a virtual image.

After the refractive angles are amplified, the N beams enter thin lens 26 all along x direction. The optical axis of the lens 26 is also located on the X axis. $f_4$ is the focal distance of the lens 26. Then, the N parallel beams all enter prism 28. The input surface of the prism 28 is planar and perpendicular to the X axis.

In the prism 28, the height of the central line of the beam corresponding to the angular frequency $\omega_j$ is $H_j$, the travel distance of the beam corresponding to the angular frequency $\omega_j$ is $D_j$. From FIG. 2 and FIG. 3, $$\frac{H_j}{f_4} = tg\theta'_j. \tag{9}$$

When the beams travel a distance D in the prism 28, two beams corresponding to the angular frequencies $\omega_j$ and $\omega_{j-1}$ will produce an optical path difference $\Delta P_j$ as $$\Delta P_j = D\Delta n_j, \; j=0,1,2,3,\ldots,N-1, \tag{10}$$

where $$\Delta n_j = n_{j-1} - n_j. \tag{11}$$

If the positive dispersion generated in the turbid medium needs to be compensated ideally, all optical path differences produced by all pairs of two frequency adjacent beams in the turbid medium must be generated in the prism 28 equally but with the opposite signs, that is, a mirrored negative dispersion must be generated.

To generate mirrored negative dispersion, the prism 28 must be made of the same medium as the turbid medium, or the prism 28 must have the same or very approximate dispersion property as the turbid medium. If doing so, the first order and second order derivatives of the prism 28 refractive index with respect to the frequency all are the same as those of the turbid medium, that is, $$\frac{dn}{d\omega} = \frac{dn'}{d\omega}, \tag{12}$$

$$\frac{dn^2}{d\omega^2} = \frac{dn'^2}{d\omega^2}. \tag{13}$$

The second-order derivative of the medium refractive index with respect to the frequency determines the group velocity of the light pulse traveling in the medium. It is a substantive requirement for dispersion compensation [see the reference: R. L. Fork, O. E. Martinez, and J. P. Gordon, "Negative dispersion using pairs of prisms," Opt. Lett. 9(5), 150-152, 1984].

To satisfy the above requirement has become relatively easy in recent years. For example, to find a material whose optical property is approximate to the human tissues is not difficult because of the development of tissue simulating phantoms [see the reference: B. W. Pogue, and M. S. Patterson, "Review of tissue simulating phantoms for optical spectroscopy, imaging and dosimetry," J. Biomed. Opt., 11(4), 02.1-02.16, 2006]. In the optical spectroscopy, imaging, and therapy research fields, such simulating materials have been widely used. The dispersion, absorption and scattering properties of these materials are characteristic of human tissues. Of course, to choose the material to make the prism 28, its light absorption and scattering should be small for saving light energy. If the chosen material is soft, the prism 28 may be made to be a transparent container and filled with the chosen material.

Suppose the optical path difference produced by two beams corresponding to the angular frequencies $\omega_j$ and $\omega_{j-1}$ in the turbid medium is $\Delta P'_j = D'\Delta n'_j$, where $\Delta n'_j = n'_j - n'_{j-1}$, and $n'_j$ and $n'_{j-1}$ are the refractive indexes of the turbid medium corresponding to the angular frequencies $\omega_j$ and $\omega_{j-1}$. D' is the traveling distance of the beam corresponding to the angular frequency $\omega_j$ in the turbid medium. After satisfying the requirement for medium dispersive property, the negative dispersion generation device needs to generate the following optical path differences $$\Delta P_j = -\Delta P'_j = -D'\Delta n_j, \; j=0,1,2,3,\ldots,N-1, \tag{14}$$

In addition, except for the prism 28, other optical elements used in the negative dispersion generation device also produce positive dispersions. If the total value of the traveling path lengths of the beams in these elements is much less than D', these additional positive dispersions can be ignored. Otherwise, they need to be compensated too.

In FIG. 2, the beam traveling path lengths in the splitters 14, 16 and prism 22 are $D_{b1}$, $D_{b2}$ and $D_{P1}$. Supposing that the lenses 18, 20, 24 and 26 all are thin lenses, that is, the Gaussian lenses [see the reference: D. S. Goodman, "General principles of Geometric Optics," Handbook of Optics, McGRAW-Hill, 1995, Vol. I]. The light rays emitted from the focal point of each lens, whether passing through the lens center or lens edge later, will all become parallel rays and form a planar wavefront perpendicular to the lens optical axis. Thus, in other words, the light rays emitted from the focal point of each lens all have the same optical path length after passing through the lens. Therefore, when the thicknesses of the thin lenses 18, 20, 24 and 26 along their optical axes are $D_{L1}$, $D_{L2}$, $D_{L3}$ and $D_{L4}$, then $D_{L1}$, $D_{L2}$, $D_{L3}$ and $D_{L4}$ are the optical path lengths for the beams passing through them. Thus, D' becomes D"

$$D'' = D' + D_{b1} + D_{b2} + D_{P1} + D_{L1} + D_{L2} + D_{L3} + D_{L4}. \tag{15}$$

Note that the Eq. (15) has assumed the beam splitters 14, 16, the prism 22, and the thin lenses 18, 20, 24 and 26 all are made of the same medium or have the same or very approximate dispersive property as the turbid medium.

Because the prism 28 can only be made by a positive dispersive medium, to produce negative optical path difference for any pair of two beams corresponding to the angular frequencies $\omega_j$ and $\omega_{j-1}$ when $\omega_j > \omega_{j-1}$, the only way is to change the propagation distance difference of any pair of two beams in the prism 28.

If the propagation distances of the two beams corresponding to the angular frequencies $\omega_j$ and $\omega_{j-1}$ are $D_j$ and $D_{j-1}$, respectively, $D_j$ and $D_{j-1}$ must satisfy the condition $$D_j n_j - D_{j-1} n_{j-1} \approx \Delta D_j n_j = \Delta P_j = -\Delta P'_j = -\Delta P''_j, \; j=0,1,2,3,\ldots,N-1. \tag{16}$$

Where $\Delta D_j = D_j - D_{j-1}$.
Rearranging Eq. (16), we have $$\Delta D_j = -D''\frac{\Delta n_j}{n_j} = D''\frac{n_{j-1} - n_j}{n_j} \tag{17}$$

$$j = 0,1,2,3,\ldots,N-1.$$

Eq. (17) gives the negative optical path difference required for two beams corresponding to the angular frequencies $\omega_j$ and $\omega_{j-1}$ in the prism 28. Thus, the total required propagation distance $D_j$ of the beam corresponding to the angular frequency $\omega_j$ in the prism 28 is $$D_j = \Delta D_{n-1} + \Delta D_{N-2} + \Delta D_{N-3} + \ldots + \Delta D_j. \tag{18}$$

The negative dispersion generation devices have existed for several decades. They are used to compress the pulse width broadened by the positive dispersive medium [see the reference: R. L. Fork, O. E. Martinez, and J. P. Gordon, "Negative dispersion using pairs of prisms," Opt. Lett. 9(5), 150-152, 1984]. Therefore, their usages are just the inverse of ours. Except for this essential difference, the existing negative dispersion generation devices, some of which use prisms and some of which use gratings, can't generate the optical path difference which changes directly proportional to the change of $(n_{j-1}-n_j)/n_j$ according to Eq. (17). The reason is that the negative dispersions generated by them are also the functions of the refractive or diffractive angle. For example, the optical structure of the existing device using prisms is similar as that shown in FIG. 2, but the output surface of the prism 28 is planar. Thus, since the $D_j$ changes with $H_j$ linearly if the beams return from the planar output surface of the prism 28, and $H_j$ changes with refractive angles according to Eq. (9), the negative optical path difference produced by such a device is also the function of the refractive angle. Such distortion of the dispersion compensation will become serious when the light pulse is very short and has very wide spectral width (see more discussions below).

Therefore, a method to generate mirrored negative dispersion has been crated. It is based on using computer-controlled high precision optical machining which develops significantly in recent years, as well as retroreflective micro-mirrors whose performance has also been improved greatly in recent years.

The method is accomplished by measuring the turbid medium refractive indexes corresponding to different frequencies within the required range first. Because the number of the frequencies is large, only partial and discrete data need to be measured. Then, one can use a computer to fit refractive index change curve with frequency from the obtained data. There are several dispersion equations for fitting the refractive index change curves, such as Cauchy, Hartmann, Conrady and Kettler-Drude equations, etc. [see the reference: W. J. Smith, "Optical Materials and Interference Coatings," in Modern Optical Engineering, McGRAW-Hill, 2000, Chapter 7, p. 176].

Then $\Delta D_j$ can be calculated from the fitted refractive index curve and the required D" value according to Eq. (17). The D" value can be obtained as D' is the expected imaging distance in the turbid medium, and the optical parameters of the optical elements used in the negative dispersion device are also known. At last, the computer is used to obtain the total propagation distance $D_j$ for each beam corresponding to the angular frequency $\omega_j$ by Eq. (18).

From Eq. (8) and Eq. (9), we have $$H_j = f_4 tg[M(\theta_{N-1}-\theta_j)]. \tag{19}$$

From Eq. (7), we have $\theta_j = n_j \arcsin \beta$ and $\theta_{N-1} = n_{N-1} \arcsin \beta$. Thus, $$H_j = f_4 tg[M(n_{N-1}\arcsin\beta - n_j \arcsin\beta)]. \tag{20}$$

Using $H_j$ value as the position for a point on the Z axis, and using $D_j$ value corresponding to that $H_j$ as the position for that point on the X axis, thus, a data group that contains N data pairs for N points can be produced in the same way. Then, the computer is used to fit a smooth curve which connects the N point positions of $(D_j, H_j)$ from the produced data group. At last, the computer-controlled high precision grinding and polishing are used to shape the output surface of the prism 28 according to the fitted smooth curve.

In recent years, the computer-controlled high-precision optical grinding and polishing have been developed significantly, which can even fabricate the optical elements with very large size. For example, in fabricating a large optical reflector with curvature radius of 36 m, the surface fabrication deviation is less than $\pm 1/36000$, and the surface roughness is <1 nm [see the reference: D. W. Kim, H. M. Martin, and J. H. Burgea, "Calibration and optimization of computer-controlled optical surfacing for large optics," Proc. SPIE, 8126, 15.1-15.10, 2011].

It means that if the optical path difference to be compensated by the prism 28 is 0.1 m, which is the value for compensating very large optical path difference (see description below), the maximum surface shaping deviation is $\pm 2.78$ μm. This deviation is much less than the compensation deviation caused by the existing negative dispersion generation devices (also refer the description below).

When the N beams are incident on the output surface of the prism 82, because the output surface shape is generally non-planar and non-spherical, the incident angles of the beams are different. Especially, since the incident beams are focused beams, even the light rays of each beam have different incident angles. Therefore, these beams can't return back along their incident paths by simply making the prism output surface become a reflective surface.

This problem can be solved by using retroreflective micro-prism mirrors. The optical tetrahedron is a well-known optical retroreflective element. It can be regarded as a corner cut from an optical cube, and so is called as the corner reflector too. It has 4 equilateral triangular faces. Three of them are perpendicular to each other and form the reflective faces. When a beam enters such a reflector from its fourth face, regardless of the incident direction, after the reflections by 3 reflective faces, the incident beam will go back along its incident direction completely. With the miniaturization of the tetrahedrons, a large number of tiny tetrahedrons are placed on a thin or even soft sheet surface to form an optical retroreflective mirror layer. Such retroreflective sheets have been widely used as the traffic and safety markings for the applications in the night or in dim light environments. In recent years, the micro-prisms are used as the tiny tetrahedrons and are placed in arrays on thin hard or soft sheet surface. These retroreflective sheets can reflect light beams within wide spectral range. When the beam incident angle is less than 30°, the reflectivity can be >90%. The average diameter of these micro-prisms is less than 45 μm [see the reference: A. Lundvall, F. Nikolajeff, and T. Lindstrom, "High performing micromachined retroreflector," Opt. Express, 11(20), 2459-2473, 2003; A. Poscik, J. Szkudlarek, and G. Owczarek, "Photometric properties of retroreflective materials in dependence on their structure and angle of illumination," Fibres Text. East. Eur. 3(135), 58-64, 2019].

When a soft micro-prism retroreflective mirror layer is pasted on the smooth output surface of the prism 28 by optical glue, the focused beams with different incident angles can be returned to travel along their incident paths completely. The incident angles of the different beams should be less than 30° to get better reflectivity or at least less than the total internal reflective angle. Thus, the curvature at any point on the output surface of the prism 28 cannot be too small, which can be achieved by increasing the angular magnification M of the lens 24 or/and the focal length $f_4$ of the lens 26. Note that the returned beams will travel along their previous path once more, so D" in Eq. (15) should be reduced to 0.5 D".

Figure 4:
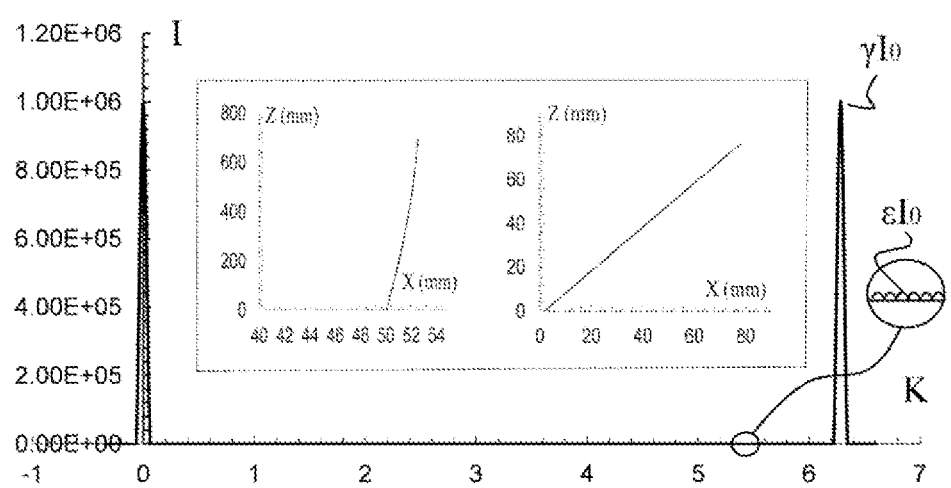
FIG. 4 illustrates the change of composite light intensity of multi-beam interference in dispersive medium. Left inset and right inset: the output surface shapes of the prisms of generating negative dispersions for medical and underwater imaging. The light intensity I changes with the parameter K. Not that just taking N=1000.
Figure 5:
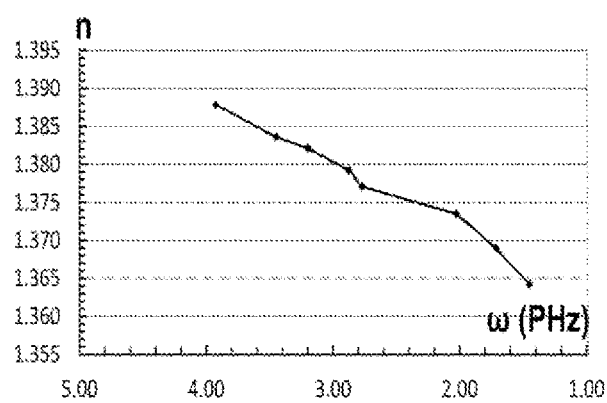
FIG. 5 illustrates the change of the refractive index n of human hemoglobin with the angular frequency $\omega$. The wavelength range is 1300 nm-480 nm, which corresponds to the angular frequency range of 1.44997 PHz-3.92699 Phz (1 PHz=$10^{15}$ Hz) [data source: A. N. Bashkatov, et al, "Measurement of tissue optical properties in the context of tissue optical clearing," Journal of Biomedical Optics, Vol. 23(9), 2018, pp. 091416.1-091416.31]. Note that the curve is not smooth because of shortage of the measured data.
Figure 6:
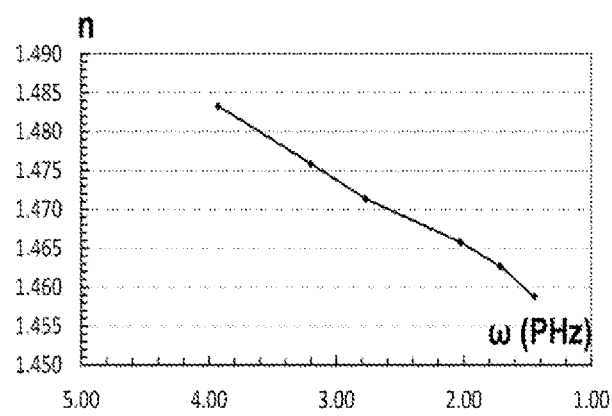
FIG. 6 illustrates the change of the refractive index n of human adipose tissue with the angular frequency $\omega$. [data source: A. N. Bashkatov, et al, "Measurement of tissue optical properties in the context of tissue optical clearing," Journal of Biomedical Optics, Vol. 23(9), 2018, pp. 091416.1-091416.31].

The left inset in FIG. 4 shows the calculated shape of the prism 28 output surface for medical imaging in the human body. In the calculations, the $H_j$ and $D_j$ values are calculated by Eq. (19) and Eq. (18). The other parameters taken in the calculations are: $\beta=29.5°$, the wavelength change range is from 400 nm to 1400 nm, which corresponding angular frequency change range is from 1.346 PHz to 4.736 PHz (1 PHz=$10^{15}$ Hz). The correspondent refractive index change range is from 1.4356 to 1.4117. $f_4=0.5$ m, M=1, and D"=30 cm. The expected imaging distance in human body is 20 cm. The change rates of the refractive index with the angular frequency of human hemoglobin and human adipose tissue shown in FIG. 5 and FIG. 6 are used for the calculations [see the reference: A. N. Bashkatov, K. V. Berezin, K. N. Dvoretskiy, M. L. Chernavina, E. A. Genina, V. D. Genin, V. I. Kochubey, E. N. Lazareva, A. B. Pravdin, M. E. Shvachkina, P. A. Timoshina, D. K. Tuchina, D. D. Yakovlev, D. A. Yakovlev, I. Y. Yanina, O. S. Zhernovaya, and V. V. Tuchin, "Measurement of tissue optical properties in the context of tissue optical clearing," J. Biomed. Opt. 23(9), 1416.1-1416.31, 2018].

The left inset in FIG. 4 shows that the required height of the prism 28 is 692 mm. The required length of the prism 28 is from 50 mm to 52.54 mm. The real maximum optical path compensation is just 2.54 mm. The reason of making the prism length be more than 50 mm is for increasing the prism mechanical strength. To get short initial broadening period $T_{ib}$, the ultra-short pulse of ~2 fs is used. The calculated shape of the prism output surface is clearly non-planar and non-spherical. It confirms that if the output surface shape of prism 28 is planar like the existing device, the required mirrored negative dispersion can't be obtained.

The errors of the dispersion compensation of the designed device need to be discussed. For most of the N beams, their focal points don't fall on the output surface of the prism 28. Furthermore, only the center line of each beam travels an exact distance $D_j$, thus some optical path compensation errors will occur. However, the caused path length errors can be less than 25 μm. FIG. 3 shows the optical path diagram of the thin focused beams corresponding to the angular frequencies $\omega_0$, $\omega_{N-1}$ and $\omega_c$. If the diameters of the thin focused beams are δ at the input surface of the prism 22. δ can be shrank to 1 mm for visible light beam no problem. F is the focusing plane of the lens 20 for the N beams (the focuses of the lens 24 and lens 26 for the N beams are much less the lens 20, and so are neglected), which is perpendicular to the X axis, and is through the point of $(D_C, H_C)$ on the output surface of the prism 28. The point of $(D_C, H_C)$ is the focusing point of the beam corresponding to the angular frequency $\omega_c$, and $\omega_c=(\omega_{N-1}-\omega_0)/2$. Thus, the diameters of the N beams on the output surface of the prism 28 are much smaller than δ. For example, if the distance from the center of the lens 20 to the plane F is $L_C$ along the X axis, and the length difference of $D_0-D_{N-1}$ is $L_f$, then, when δ=1 mm and $L_f=L_C/20$, the diameters of the N beams on the output surface of the prism 28 are less than 25 μm because the plane F is at the center of the positions of $D_0$ and $D_{N-1}$. Therefore, the optical path compensation errors caused by the beam diameters will be less than 25 μm on the output surface of the prism 28.

The optical path compensation errors caused by the retroreflective mirror layer are small too. As described above, the average diameter of the micro-prism mirrors is less than 43 μm, so the average depth of the micro-prism mirror layer is less than half of 43 μm. Considering that the light rays of each beam will produce an approximate planar wavefront when they return back from the retroreflective mirror layer, the optical path differences caused by the reflection of the micro-prism mirror layer should be significantly less than half of 43 μm.

The returned N beams from the prism 28 recombine in the prism 22. After being reflected by beam splitter 16 and mirror 30, these beams become parallel beams and enter an imaging distance adjuster consisting of two triangular components 32 and 34. Because the length and shape of the prism 28 have determined a imaging distance D' in the turbid medium by the Eq. (15), Eq. (17) and Eq. (18), every apparatus has a fixed imaging distance D'. Therefore, if the expected imaging depth in the human body is $D_b$, the distance changes by adjusting two components 32 and 34 are $D_{A3}$ and $D_{A4}$, then to make $$D'=D_{A3}+D_{A4}+D_b. \quad (21)$$

The expected imaging depth $D_b$ can be adjusted by changing $D_{A3}+D_{A4}$. Note that the two components 32 and 34 should be made using the same medium as the turbid medium or have the same or very approximate dispersive property as the turbid medium too. Because two triangular components have symmetrical shapes, no unwanted dispersions will be produced by the distance adjuster.

Then, the N parallel beams enter the human body 40 by reflection of the mirror 36. If there is no lens 38, an inner light layer will be created at the depth of $D_b$. The layer thickness is determined by two factors. One is the number N of the beams and the frequency interval $\Delta v(2\pi\Delta v=\Delta\omega)$ of the N beams according to the relation of $N\Delta v\Delta\tau=1$ [see the reference: W. H. Carters, "Coherence theory," in Handbook of Optics, McGRAW-Hill, 1995, Vol. I, p. 4.3], where $\Delta\tau$ is the duration of the light pulse when $\Delta\phi_j=0$, which determines the internal light layer thickness δH by $\delta H=V_h\Delta\tau$, where $V_h$ is the average speed of the N beams in the human body. If the total spectral width of the N beams is wide enough, the layer thickness can be very thin, such as less than 1 μm. Another factor is the initial broadening period $T_{ib}$. The pulse broadening due to the chromatic dispersion can be estimated as [see the reference: C.-A. Bunge, M. Beckers, and B. Lustermann, Polymer Optical Fibres, Fibre Types, Materials, Fabrication, Characterization and Applications, Elsevier Ltd, Woodhead Publishing, 2017, pp. 47-118]

$$\Delta T'=L'\Delta\lambda d_c, \quad (22)$$

Where $\Delta\lambda$ is the pulse spectral width in wavelength, $d_c$ is chromatic dispersion coefficient, and L' is the propagation distance of the pulse in the dispersive medium, $\Delta T'$ is full width of half maximum (FWHM) of the pulse. For example, the typical value of $d_c$ is 20 ps/nm·km at 1550 nm for telecom fibers. Thus, if $\Delta\lambda=1000$ nm, which corresponds to 2 fs light pulse, when L'=1 mm, $\Delta T'=20$ fs. Because 2 fs pulse broadens to 20 fs, the peak light intensity of the pulse should drop to below 10% of its maximum value. For seawater, typical $d_c$ values are from 60 ps/nm·km to 300 ps/nm·km [see the reference: "Seawater intrusion and mixing in estuaries," Marine Species Introduced Traits Wiki, 2020, marinespecies.org/introduced/wiki/Seawater_intrusion_and_mixing_in_estuaries#Experimental_determination_of_the_longitudinal_dispersion_coefficient].

Considering that ~60% of human body is water by weight, thus roughly speaking, the ultra-short light pulse of fs level can broaden fast enough in the human body too (the dispersion coefficients of the human tissues have not been found temporarily). Therefore, if a pulse of fs level broadens by negative dispersion first, then it will shorten fast enough in the human body during the last shortening period $T_{ls}$. Thus, the light energy loss due to light absorption and scattering during the last shortening period $T_{ls}$, is small. Fortunately, obtaining ultrafast, high power fs lasers is not difficult nowadays.

In FIG. 2, the N beams are focused by lens 38 when they enter the human body 40. It is for confocal imaging to improve the imaging longitudinal resolution, which will be explained later.

The signal light beams reflected by the targeted tissue return along the incident path reversely. Generally, the N beams constituting the incident pulse will all be reflected by the target tissue. The reflections occur on the interface on the targeted tissue surface and between the two areas with different refractive indexes. The reflectivities of the interface for N beams don't differ much usually. During the return path, the signal light pulse will broaden by positive dispersive tissues again as the signal light pulse still contains multiple frequency components, that is, the multiple beams, which results in decrease of the composite intensity of signal light beams, and so results in decrease of the light absorption and scattering in the body again. Then, the signal light beams exit the body. The optical path differences of the signal light beams are further enlarged by positive dispersive imaging distance adjuster. After reflected by beam splitter 16, the signal light beams enter the prism 28 again. This time, the broadened signal pulse will be compressed by negative dispersion in the prism 28, which is similar to the process that happens in the existing negative dispersion generation devices. Because the return process of the signal pulse is a completely reverse process of the laser pulse illumination process, the detailed mathematical description does not need.

When the signal beams reach the beam splitter 14 again, the signal light beams travel a distance which equals D" exactly. Thus, the expected signal pulse appears by constructive interference of N signal beams. After reflected by beam splitter 14, as beam splitter 14 has high reflectivity, most of the energy of the signal light pulse is focused on the image plane 48 by lens 44.

The influences of the atmosphere gaps between the optical elements in the apparatus all are ignored as the same reasons described above.

If lens 38 is not used, the designed apparatus has the most popular imaging structure, which can make one point on the object plane become one point on the image plane directly. This structure can easily combine existing ultra-resolution technologies [see the reference: G. Huszka, and M. A. M. Gijs, "Super-resolution optical imaging: A comparison," Micro and Nano Eng. 2, 7-28, 2019], such as to place a phase filter before the focusing lens 44. In this way, the imaging resolution along the object plane can exceed the theoretical diffraction limit, which is significantly less than the beam wavelengths.

Using lens 38 is for improving the longitudinal resolution. Because during the last shortening period $T_{ls}$ in the human body, the light pulse intensity will be significantly large. For example, as described above, within the range of 1 mm, the intensity of a 2 fs pulse is about 10% of its maximum value in the telecom fiber. As the initial broadening period and the last shortening period has equal length in the same medium, the effective thickness of a 2 fs pulse will be much larger than its theoretical thickness of approximate 0.2 μm in the human body, which will reduce the longitudinal resolution of the imaging. The confocal imaging can solve this problem [see the reference: S. Inoue, and R. Oldenbourg, "Microscopes," in Handbook of Optics, McGRAW-Hill, 1995, Vol. II]. By using lens 38 to focus the illumination light beams to scan the targeted tissue, and using a spatial pinhole 46 placed before the image plane 48 to block out-of-focus light in image formation, the imaging longitudinal resolution can be increased to wavelength level, that is, about 1 μm, and with better contrast.

Figure 7:
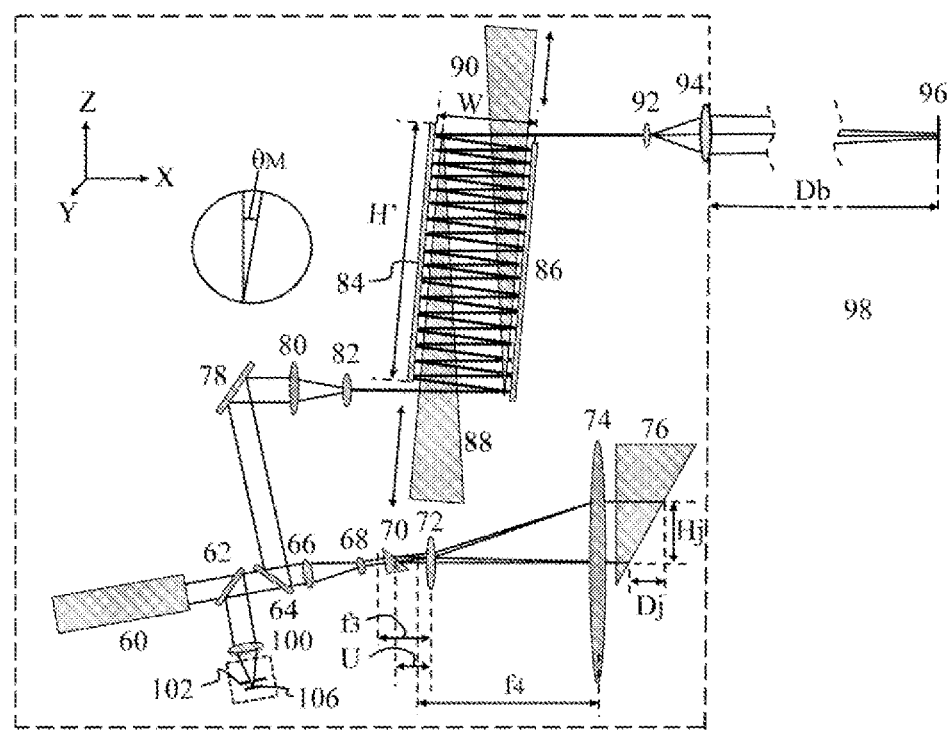
FIG. 7 illustrates the schematic diagram of optical structure of the underwater imaging apparatus.

FIG. 7 is the optical structure of the designed underwater imaging apparatus. It contains mode-locked laser 60, the beam splitters 62 and 64, the thin lenses 66, 68, 72, 74, 80 and 82, the prisms 70, 76, and the mirror 78. Because its most parts are the same as the medical imaging apparatus, we just introduce its imaging distance adjuster.

The imaging distance adjuster is composed of two paralleled mirrors 84 and 86, and two triangular components 88 and 90. Two mirror planes are inclined at an angle $\theta_M$ to Z axis.

Since the desired imaging distance underwater is long, after N parallel beams entering the distance adjuster, each beam will be reflected multiple times in the adjuster. Making the diameter of each beam be small, thus each beam can obtain a larger number of reflections between two mirrors. If the expected imaging distance in the seawater 98 is $D_b$, the distance change by adjusting the components 88 and 90 is $IID_w$, and the designed imaging distance of the apparatus is D'. By making $D'=D_b+IID_w$, the $D_b$ can be adjusted by changing $IID_w$. Here, Π is the number of the reflection times of a beam between two mirrors, $D_w$ is the travelling distance of a beam in two components between two reflections. $D_w$ is not indicated in FIG. 6, since it is a variable changing with the moving of two components 88 and 90. In FIG. 7, one can see that when the distance between two mirrors is W, after each reflection, the beam rises a distance of Wtg($\theta_M$) on the mirror plane. Therefore, if the height of the two mirrors is H', the maximum number of the reflection times of each beam between two mirrors is Π=H'/Wtg($\theta_M$). Thus, the maximum distance of a beam travelling between two mirrors is H'$D_w$/Wtg($\theta_M$), and so a small incident angle $\theta_M$ and a large mirror height are required. Because the diameters of the beams are small, such as a diameter of 5 mm, the required thickness of the imaging distance adjuster is thin, such as less than 10 mm, so the distance adjuster can have moderate volume and light weight. When H'=1 m, tg($\theta_M$)=0.01 and $D_w \approx$ W, $IID_w$/Wtg($\theta_M$) can be 100 m. Furthermore, if required, the distance adjuster can be a composite distance adjuster composed of multiple, such as 10, distance adjusters. Thus, if each distance adjuster has an adjusting distance of 100 m with height of 1 m and thickness of 10 mm, the composite adjuster can have an adjusting distance of 1000 m with height of 1 m and thickness of 10 cm.

After the diameters of the N beams are expanded by the lens 92 and 94, and these beams are not focused by the lens 94, the N parallel beams enter the seawater 98 and form an inner light layer on the object plane 96 at the position with the distance of $D_b$.

The signal light produced by reflection from the object in the formed light layer returns back along the incident path reversely, and going through a process similar to that of the medical imaging described above. At last, the signal light beams are reflected by the beam splitter 62 and create the expected signal light pulse, which is focused on the image plane 106 by lens 100.

In the same way, to improve the longitudinal resolution of imaging, the N beams are focused by lens 94 to scan the object in the seawater, and a spatial pinhole 102 is placed before the image plane 106 to form the confocal imaging.

Although the atmosphere gaps in this apparatus are somewhat larger, as atmospheric dispersion in dozens to hundreds of meters is still small, the dispersions caused by these gaps are neglected too.

The right inset in FIG. 4 shows the calculated shape of the prism 76 output surface for underwater imaging in the seawater. In the calculations, the $H_j$ and $D_j$ value are calculated by Eq. (19) and Eq. (18) too. The parameters taken in the calculations are: $\beta=29.5°$, the wavelength change range is from 546.4 nm to 550 nm, and the corresponding angular frequency change range is from 3.427 PHz to 3.450 PHz. The refractive index change range is from 1.4356 to 1.4358. $f_4=10$ m, M=50, and D"=1000 m. The expected imaging distance in seawater is near 1000 m. The calculation results show that the required height of the prism 76 is 76.4 mm. The required length of the prism 76 is from 1.70 mm to 78.1 mm. Since the light pulse with duration of about 0.5 ps is used, the correspondent spectral width is only 3.6 nm narrow. The output surface shape of the prism 76 is an approximate plane. The change rate of the refractive index with the angular frequency of pure water shown in FIG. 8 [see the reference: W. M. Haynes, D. R. Lide, and T. J. Bruno, *CRC Handbook of Chemistry and Physics*, 95$^{th}$ ed, CRC Press, 2014-2015, pp. 10.244-10.255] is used for the calculations.

BRIEF DESCRIPTION OF PERFORMANCE OF THE INVENTION

From Eq. (1) and Eq. (3), and as the initial phases $\varphi_j$ are zero at x=0 and t=0, we have $$E(x, t) = A(x)\sum_{j=0}^{N-1} e^{i\left[(\omega_0+j\Delta\omega)\left(t-\frac{xn_j}{C}\right)\right]} + C.C \quad (23)$$

$$j = 0, 1, 2, 3, \ldots, N-1.$$

Figure 8:
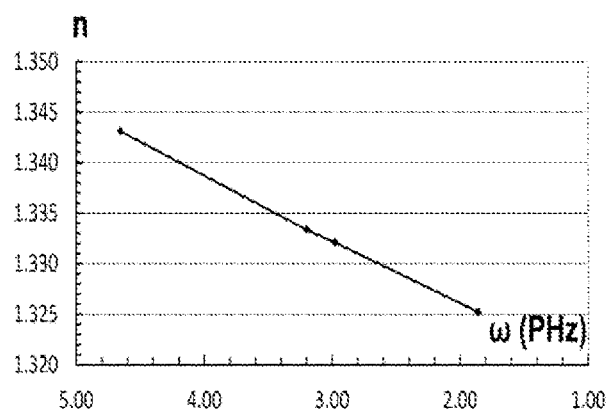
FIG. 8 illustrates the change of refractive index n of pure water with the angular frequency $\omega$. Note that the visible light region (wavelength range: 400 nm-700 nm) is corresponding to the angular frequency $\omega$ region of 4.71 PHz-2.69 PHz [data source: "CRC Handbook of Chemistry and Physics," 95th edition, edited by W. M. Haynes, D. R. Lide, T. J. Bruno, CRC Press, New York, 2014-2015, p. 10.245].

The refractive indexes of many optical media change approximately linearly with the angular frequency, especially for the water, which can be seen in FIG. 5, FIG. 6 and FIG. 8. Note that the refractive index measurements of human tissues are not easy. The shortage of measured data and inevitable measurement errors make the change curves not smooth in FIG. 5 and FIG. 6. In addition, the total spectral width of the required N beams is often narrow, such as for underwater imaging. Thus, in order to simplify theoretical analyses, we may suppose that the refractive index of the turbid medium changes approximately linearly with the angular frequency. Because there is a large amount water in the body as described before, such approximation is acceptable for medical imaging and underwater imaging. Thus, we have $$n_j = n_0 + j\Delta n, \ j=0,1,2,3\ldots,N-1, \quad (24)$$

where $n_0$ is the refractive index of the turbid medium corresponding to the angular frequency $\omega_0$. Thus, because of Eq. (1), we have $$\Delta n = k\Delta\omega. \quad (25)$$

k is a proportion constant. Thus, $$(\omega_0 + j\Delta\omega)\left(t - \frac{xn_j}{C}\right) = t\omega_0 - \frac{x}{C}\omega_0 n_0 + jt\Delta\omega - j\frac{x}{C}\Delta\omega(2k\omega_0 + jk\Delta\omega). \quad (26)$$

Because $\Delta\omega<<\omega_0$, and even $(N-1)\Delta\omega$ is still less than $\omega_0$ in many situations, Eq. (26) can be written approximately as $$(\omega_0 + j\Delta\omega)\left(t - \frac{xn_j}{C}\right) \approx t\omega_0 - \frac{x}{C}\omega_0 n_0 + jt\Delta\omega - j\frac{x}{C}2k\omega_0\Delta\omega. \quad (27)$$

Replacing the phase item in square bracket of Eq. (23) by Eq. (27), then, the Eq. (23) becomes $$E(x, t) = A(x)e^{i\left(\omega_0 t - \frac{x}{C}\omega_0 n_0\right)}\sum_{j=0}^{N-1}\cos(jK\Delta\omega), \quad (28)$$

where $K=t-(2\times n_0/C)$.

Using triangular series sum formula, the composite light intensity of the multi-beam interference of the N beams in dispersive medium is $$I = E(x, t)E(x, t)^* = A^2(x)\frac{\cos^2\left[\frac{(N-1)(K\Delta\omega)}{2}\right]\sin^2\left(\frac{NK\Delta\omega}{2}\right)}{\sin^2\left(\frac{K\Delta\omega}{2}\right)}. \quad (29)$$

When $K\Delta\omega$ becomes zero, the value of I goes to the maximum. The results of numerical calculations by Eq. (29) are shown in FIG. 4 and Table 1. In FIG. 4, I changes with parameter K. Using K as the unit of transverse coordinate is for avoiding complicated theoretical derivations, and the essential characteristics of the multi-beam interference in optical dispersive medium can still be shown. The I curve in FIG. 4 may be regarded as the change of the composite light intensity of N beams with x at the moment when the inner light layer is recreated. In the calculations, A=1. In order to show the width of the composite light intensity maximum obviously, just taking N=1000.

In the Table 1, N is the number of the beams participating in the interference. $\gamma$ is the enhancement factor of the composite light intensity maximum $\gamma I_0$. $\varepsilon$ is the attenuation factor of the remaining composite light intensity $\varepsilon I_0$ between two composite light intensity maximums (see FIG. 4). $I_0$ is the incident intensity of each beam of the N beams. We see that $\gamma$ increases with N increase rapidly. The fluctuations of $\varepsilon$ at the beginning stage when N increases may be caused by insufficient computational accuracy of the computer or program we used.

TABLE 1

| Signal Intensity Enhancement at Different Imaging Depth in Human Body by Multi-beam Interference. | | | | | | | | |
|---|---|---|---|---|---|---|---|---|
| N | $\gamma$ | $\varepsilon$ | Factor | D' = 2 cm | D' = 5 cm | D' = 10 cm | D' = 15 cm | D' = 20 cm |
| 1.00E+01 | 1.00E+02 | 5.05E−14 | $\xi$ | 1.10E−01 | 1.10E−01 | 1.10E−01 | 1.10E−01 | 1.10E−01 |
| 1.00E+02 | 1.00E+04 | 6.11E−10 | $\xi$ | 1.10E+01 | 1.10E+01 | 1.10E+01 | 1.10E+01 | 1.10E+01 |
| 1.00E+03 | 9.97E+05 | 6.21E−06 | $\xi$ | 1.10E+03 | 1.10E+03 | 1.09E+03 | 1.09E+03 | 1.09E+03 |
| 1.00E+04 | 7.08E+07 | 2.80E−06 | $\xi$ | 7.79E+04 | 7.79E+04 | 7.78E+04 | 7.78E+04 | 7.78E+04 |

TABLE 1-continued

Signal Intensity Enhancement at Different Imaging Depth
in Human Body by Multi-beam Interference.

| N | γ | ε | Factor | D' = 2 cm | D' = 5 cm | D' = 10 cm | D' = 15 cm | D' = 20 cm |
|---|---|---|---|---|---|---|---|---|
| 1.00E+05 | 7.08E+09 | 1.13E−05 | ξ | 7.78E+06 | 7.78E+06 | 7.76E+06 | 7.75E+06 | 7.74E+06 |
| 1.00E+06 | 7.08E+11 | 9.35E−06 | ξ | 7.79E+08 | 7.78E+08 | 7.77E+08 | 7.76E+08 | 7.75E+08 |
| 1.00E+07 | 7.08E+13 | 5.31E−06 | ξ | 7.79E+10 | 7.78E+10 | 7.78E+10 | 7.77E+10 | 7.77E+10 |
| 1.00E+01 | 1.00E+02 | 5.05E−14 | α (dB) | 2.63E+02 | 6.27E+02 | 1.23E+03 | 1.84E+03 | 2.45E+03 |
| 1.00E+02 | 1.00E+04 | 6.11E−10 | α (dB) | 2.83E+02 | 6.47E+02 | 1.25E+03 | 1.86E+03 | 2.47E+03 |
| 1.00E+03 | 9.97E+05 | 6.21E−06 | α (dB) | 3.03E+02 | 6.67E+02 | 1.27E+03 | 1.88E+03 | 2.49E+03 |
| 1.00E+04 | 7.08E+07 | 2.80E−06 | α (dB) | 3.21E+02 | 6.85E+02 | 1.29E+03 | 1.90E+03 | 2.51E+03 |
| 1.00E+05 | 7.08E+09 | 1.13E−05 | α (dB) | 3.41E+02 | 7.05E+02 | 1.31E+03 | 1.92E+03 | 2.53E+03 |
| 1.00E+06 | 7.08E+11 | 9.35E−06 | α (dB) | 3.61E+02 | 7.25E+02 | 1.33E+03 | 1.94E+03 | 2.55E+03 |
| 1.00E+07 | 7.08E+13 | 5.31E−06 | α (dB) | 3.81E+02 | 7.45E+02 | 1.35E+03 | 1.96E+03 | 2.57E+03 |

Defining $\mu_a$ and $\mu_s$ as the absorption and scattering coefficients of the turbid medium. For normal light propagation in the turbid medium, according to Beer-Lambert law [see the reference: J. D. J. Ingle, and S. R. Crouch, Spectrochemical Analysis, Prentice Hall, 1988], the change of the light intensity I with distance x in the medium is $$I = NI_0 e^{[-(\mu_a+\mu_s)x]}, \quad (30)$$

where $NI_0$ is the total incident light intensity of the N beams. When the incident beam group travels a distance of D', it is reflected by the object and becomes the signal beam group. If the object reflectivity is R, when the return signal beam group arrives at the observer, the signal beam group intensity becomes $$I = RNI_0 e^{[-2(\mu_a+\mu_s)D']}, \quad (31)$$

In Eq. (31), it has been assumed that all optical elements used in the apparatus have low light absorption and scattering. Thus, D" can be replaced by D'. When using the proposed method, in the propagation path the composite light intensity of the beam group is reduced to $\varepsilon NI_0$. Because $\mu_a$ and $\mu_s$ are the absorption and scattering coefficients which express the light intensity attenuation ratio per unit distance, and the remaining beam group intensity is reduced to the $\varepsilon$ times of $NI_0$, which is equivalent approximately to that the attenuation ratios of the light absorption and scattering are reduced to the $\varepsilon$ times of their original values, therefore, when the beam group travels a distance of x in the medium, the beam group light intensity change caused by the absorption and scattering is $$I' = NI_0 e^{[-\varepsilon(\mu_a+\mu_s)x]}. \quad (32)$$

When the beam group travels the distance D' and is reflected by the object to become the signal beam group, and if the object reflectivity is R', when the return signal beam group reaches the observer, the signal beam group light intensity becomes $$I' = R'NI_0 e^{[-2\varepsilon(\mu_a+\mu_s)D']}. \quad (33)$$

The ratio of I' in Eq. (33) to I in Eq. (31) is signal intensity enhancement factor, which is the ratio of the signal intensity produced by the proposed method and the signal intensity produced by the normal method. From $$\frac{I'}{I} = \frac{R'NI_0 e^{[-2\varepsilon(\mu_a+\mu_s)D']}}{RNI_0 e^{[-2(\mu_a+\mu_s)D']}}, \quad (34)$$

and when using the proposed method, $R'I_0 = \gamma RI_0$, then, by rearranging Eq. (34), we have $$\alpha = \frac{I'}{I} = \gamma e^{[2(1-\varepsilon)(\mu_a+\mu_s)D']}, \quad (35)$$

where $\alpha$ is the signal intensity enhancement factor. In addition, by making $I' = NI_0$, then, from Eq. (33), we have $$\xi = \gamma R e^{[-2\varepsilon(\mu_a+\mu_s)D']}. \quad (36)$$

$\xi$ is called as the signal intensity comparison factor, which is the ratio of the received signal light intensity I' to the total incident light intensity $NI_0$ of the N illumination beams. Below, based on the absorption and scattering situations of human body and clear seawater, the signal intensity enhancements and signal intensity comparisons when using the proposed method are calculated.

In the human body, the different tissues have different refractive indexes, different absorption and scattering coefficients. Therefore, one can only use the average values of these parameters for analyses and calculations. Because there is a large amount of water and blood in the human body, the refractive index, absorption and scattering coefficients of the blood are used as the average values for various body tissues temporarily. The absorption and scattering coefficients of human blood are $\mu_a = 0.397$ mm$^{-1}$ and $\mu_s = 1$ mm$^{-1}$ [see the reference: D. J. Faber, C. G. Aalders, E. G. Mik, B. A. Hooper, M. J. C. V. Gemert, and T. G. V. Leeuwen, "Oxygen saturation-dependent absorption and scattering of blood," Phys. Rev. Lett. 93(2), 8102.1-8102.4, 2020]. They are used to calculate $\alpha$ and $\xi$ values. In FIG. 2, the target tissue in the body is not shown. In fact, various tissues fill the full body. These tissues are connected with each other. The illumination light of the inner light layer is reflected by the interface between two areas with different refractive indexes. Suppose that light is reflected from a interface between the blood and adipose, and because their refractive indexes are 1.3771 and 1.4714 respectively [see the reference: A. N. Bashkatov, K. V. Berezin, K. N. Dvoretskiy, M. L. Chernavina, E. A. Genina, V. D. Genin, V. I. Kochubey, E. N. Lazareva, A. B. Pravdin, M. E. Shvachkina, P. A. Timoshina, D. K. Tuchina, D. D. Yakovlev, D. A. Yakovlev, I. Y. Yanina, O. S. Zhernovaya, and V. V. Tuchin, "Measurement of tissue optical properties in the context of tissue optical clearing," J. Biomed. Opt. 23(9), 1416.1-1416.31, 2018], according to the Fresnel formula [see the reference: J. M. Bennett, "Polarization," in Handbook of Optics, McGRAW-Hill, 1995, Vol. I], we get the light reflectivity of R=0.0011. Finally, according to the intensity enhancement factory and the intensity attenuation factor $\varepsilon$ shown in the Table 1, we get the signal intensity enhancement factor $\alpha$ and signal intensity comparison factor $\xi$ values with different imaging depths in the human body according to Eq. (35) and Eq. (36). These values are shown in the Table 1 under different D' values of 2 cm, 5 cm, 10 cm, 15 cm and 20 cm.

For the underwater imaging, 0.0196 m$^{-1}$ and 0.0212 m$^{-1}$ are taken as the absorption coefficient $\mu_a$ and scattering coefficient $\mu_s$ of the clear seawater [see the reference: C. D. Mobley, "The Optical Properties of Water," in Handbook of Optics, McGRAW-Hill, 1995, Vol. I]. Assuming the refractive indexes of the seawater and the object are 1.34 and 1.6, the object reflectivity of R=0.00809 is obtained. Then, according to the intensity enhancement factor $\gamma$ and intensity attenuation factor $\varepsilon$ values shown in the Table 2, we get the signal intensity enhancement factor $\alpha$ and signal intensity comparison factor $\xi$ values with different imaging distances D' in the clear seawater according to Eq. (35) and Eq. (36). These values are shown in the Table 2 under different D' values of 200 m, 500 m, 1000 m, 1500 m and 2000 m.

ever man-made event of terawatts light power. It will make greater contributions to the human society in the future.

At last, we give the practical method for adjusting the distance adjuster to get accurate expected imaging distance in the turbid media. In a turbid medium, there are various compositions with different refractive indices, so it is difficult to find the accurate value of the imaging distance determined by all refractive indices of the compositions in the turbid medium. However, there is a practical way to overcome this difficulty. Because when the angular phase differences between any frequency adjacent beams become zero, the composite light intensity maximum appears certainly. Therefore, somewhat like to search for a music station by tuning the frequency of a radio, no matter what the accurate distance of the object position is, one just needs observing into the turbid medium and adjusting the distance adjuster at the same time. When the searched object appears

TABLE 2

Signal Intensity Enhancement at Different Imaging Depth in Seawater by Multi-beam Interference.

| N | Γ | ε | Factor | D' = 200 m | D' = 500 m | D' = 1000 m | D' = 1500 m | D' = 2000 m |
|---|---|---|---|---|---|---|---|---|
| 1.00E+01 | 1.00E+02 | 5.05E−14 | ξ | 1.10E−01 | 1.10E−01 | 1.10E−01 | 1.10E−01 | 1.10E−01 |
| 1.00E+02 | 1.00E+04 | 6.11E−10 | ξ | 1.10E+01 | 1.10E+01 | 1.10E+01 | 1.10E+01 | 1.10E+01 |
| 1.00E+03 | 9.97E+05 | 6.21E−06 | ξ | 1.10E+03 | 1.10E+03 | 1.09E+03 | 1.09E+03 | 1.09E+03 |
| 1.00E+04 | 7.08E+07 | 2.80E−06 | ξ | 7.79E+04 | 7.79E+04 | 7.78E+04 | 7.78E+04 | 7.78E+04 |
| 1.00E+05 | 7.08E+09 | 1.13E−05 | ξ | 7.78E+06 | 7.78E+06 | 7.76E+06 | 7.75E+06 | 7.74E+06 |
| 1.00E+06 | 7.08E+11 | 9.35E−06 | ξ | 7.79E+08 | 7.78E+08 | 7.77E+08 | 7.76E+08 | 7.75E+08 |
| 1.00E+07 | 7.08E+13 | 5.31E−06 | ξ | 7.79E+10 | 7.78E+10 | 7.78E+10 | 7.77E+10 | 7.77E+10 |
| 1.00E+01 | 1.00E+02 | 5.05E−14 | α (dB) | 2.63E+02 | 6.27E+02 | 1.23E+03 | 1.84E+03 | 2.45E+03 |
| 1.00E+02 | 1.00E+04 | 6.11E−10 | α (dB) | 2.83E+02 | 6.47E+02 | 1.25E+03 | 1.86E+03 | 2.47E+03 |
| 1.00E+03 | 9.97E+05 | 6.21E−06 | α (dB) | 3.03E+02 | 6.67E+02 | 1.27E+03 | 1.88E+03 | 2.49E+03 |
| 1.00E+04 | 7.08E+07 | 2.80E−06 | α (dB) | 3.21E+02 | 6.85E+02 | 1.29E+03 | 1.90E+03 | 2.51E+03 |
| 1.00E+05 | 7.08E+09 | 1.13E−05 | α (dB) | 3.41E+02 | 7.05E+02 | 1.31E+03 | 1.92E+03 | 2.53E+03 |
| 1.00E+06 | 7.08E+11 | 9.35E−06 | α (dB) | 3.61E+02 | 7.25E+02 | 1.33E+03 | 1.94E+03 | 2.55E+03 |
| 1.00E+07 | 7.08E+13 | 5.31E−06 | α (dB) | 3.81E+02 | 7.45E+02 | 1.35E+03 | 1.96E+03 | 2.57E+03 |

From Table 1 and 2, we can see that the signal composite light intensity maximum is much higher than the signal intensity of the normal imaging. For example, when D'=5 cm for medical imaging, or D'=500 m for underwater imaging, the intensity enhancement factor $\xi$ is more than $1.1 \times 10^3$ when N>$10^3$. It means that when N>$10^3$, and the total spectra width of N beams is wide enough, the peak intensity of the signal light pulse can be higher than NI$_0$. Note that NI$_0$ is the average value of the total intensity of the N beams (if the N beams are incoherent light beams). Of course, the extreme high pulse peak intensity is always with the extreme narrow pulse duration usually, and so the energy of each pulse may be very low. However, as long as the signal to noise ratio is high, the required signal energy can be got by receiving repeated signal pulses. It can be seen that the value $\xi$ is still high even when D'=20 cm for medical imaging, or D'=2000 m for underwater imaging. Therefore, there is good potential to get the signal intensity enhancement factor of near 2000 dB, whose corresponding imaging depth and distance are 20 cm in the human body and 2000 m in the clear seawater. Considering the approximations are made in the calculations, the signal intensity enhancement factor of 600 dB is taken for representing the apparatus performances, whose corresponding imaging depth is 5 cm in the human body, and 1000 m in the clear seawater.

It is not strange for the great performances of the designed apparatuses. The multi-beam interference had demonstrated its astonishing abilities in the past, such as the fastest ever man-made event of attoseconds light pulse, and strongest in the visual field and becomes clear, the accurate expected imaging distance is achieved.

Pulse broadening is a well known physical phenomenon [see the reference: M. Amemiya, "Pulse broadening due to higher order dispersion and its transmission limit," J. Lightwave Technol. 20(4), 591-597, 2002], and even becomes a technical barrier for short pulse light communication. Therefore, the negative dispersion generation devices are developed to compress the broadened light pulses [see the reference: R. L. Fork, O. E. Martinez, and J. P. Gordon, "Negative dispersion using pairs of prisms," Opt. Lett. 9(5), 150-152, 1984].

Essentially, the proposed imaging method is a reverse physical process of that happening in the short pulse light communication. Here, the light pulse is broadened by negative dispersion generation device first, and is compressed by positive dispersive optical medium later. In order to compress the light pulse ideally, especially for the ultra-short pulse, the mirrored negative dispersion generation device is designed.

According to light ray reversible principle [see the reference: D. S. Goodman, "General principles of Geometric Optics," in Handbook of Optics, McGRAW-Hill, 1995, Vol. I], if two optical paths have the same optical structures and the opposite spatial arrangements, the reverse optical processes will occur in two paths certainly. Therefore, the feasibility of the proposed imaging method is no problem. The only thing is the quality of the inner light layer created in the turbid medium. With performance improvement of the mirrored negative dispersion generation device, the inner light layer with high quality will be achieved.

The created imaging method has important application prospect. It is believed that this new imaging method will be widely used in the future.

I claim:

1. An apparatus of inner light layer illumination for optical imaging in turbid media, the apparatus comprising:
    a laser for generating short light pulse(s); and
    a negative dispersion generation means for broadening width of said short light pulse(s); and
    an inner light layer creation means for sending said short light pulse(s) into said turbid medium after said width broadening of said short light pulse(s) to form an inner light layer in said turbid medium to illuminate the object; and
    an imaging distance adjusting means for adjusting the distance of said optical imaging in said turbid medium; and
    wherein said turbid media include human body, animal body, seawater, river water, lake water, pond water, fog, smog, snow, ice, and
    wherein said short light pulse contains N components with different angular frequencies $\omega_j$ (j=0, 1, 2, 3, ..., N−1), N is from 3 to $10^{12}$.

2. The apparatus of claim 1, wherein said short light pulse(s) from said laser go(es) through polarizer(s) and so said N frequency components with different angular frequencies of the short light pulse(s) are polarized to become the plane polarized, or
    the elliptically polarized, or
    the circularly polarized light beams, and
    wherein said polarizer(s) represent(s) existing optical polarizing elements which polarize said short light pulse(s) to become the plane polarized; or
    the elliptically polarized, or
    the circularly polarized light beams.

3. The apparatus of claim 1, wherein said short light pulse(s) go(es) into said turbid medium after said width broadening of said short light pulse(s), and
    then said N frequency components with different angular frequencies of said short light pulse(s) become the plane light beams after reflected by the mirror(s), or
    become the cylindrical light beams after reflected by the mirror(s) and passing through the cylindrical lens(es), or
    become the spherical light beams after reflected by the mirror(s) and passing through the spherical lens(es).

4. The apparatus of claim 1, the frequencies of said N frequency components with different angular frequencies are in visible, or/and infrared, or/and ultraviolet region(s).

5. The apparatus of claim 1, wherein said laser is mode-locked laser.

6. The apparatus of claim 1, wherein said negative dispersion generation means is to construct a devise consisting of prism(s), or/and grating(s), said short light pulse(s) enter(s) said prism(s) or/and grating(s) and is/are refracted or/and diffracted by the prism(s) or/and grating(s) resulting in said N components with different angular frequencies of said short light pulse(s) travel with different optical path distances and produce negative optical path differences among said N component angular frequencies, or
    wherein said negative dispersion is the mirrored negative dispersion generating by a constructed device consisting of prism(s) with retroreflective micro-mirror layer on one output surface of a prism as retroreflective surface.

7. The apparatus of claim 1, wherein said imaging distance adjusting means is to construct an adjuster consisting of two movable triangular components, said short light pulse(s) go(es) through these two components, and the travel distances of said short light pulse(s) in these two are changed with movements of these two components, which increases/decreases the travel distance(s) of said short light pulse(s) outside said turbid medium and results in decrease/increase of the imaging distance in the turbid medium reversely for said apparatus of inner light layer illumination which total optical length for creating said inner light layer is fixed.

8. The apparatus of claim 1, wherein said inner light layer creation means using mirror(s) to reflect said short light pulse(s) into said turbid medium after said width broadening of said short light pulse(s), and
    then said N frequency components with different angular frequencies of said short light pulse(s) become the plane light beams, or
    become the cylindrical light beams after passing through the cylindrical lens(es) further, or
    become the spherical light beams after passing through the spherical lens(es) further, and finally,
    by width re-shortening of said short light pulse(s) via traveling through said turbid medium which dispersion is positive, said plan light beams create the plane inner light layer to illuminate the object in said turbid medium, or
    said cylindrical light beams create the cylindrical inner light layer or even a thin line in extreme case to illuminate the object in said turbid medium, or
    said spherical light beams create the spherical inner light layer or even a tiny point in extreme case to illuminate the object in said turbid medium.

9. The apparatus of claim 1, in said apparatus of inner light layer illumination for optical imaging the optical elements including the prism(s), lens(es) and triangular components are all made of the materials having the same or approximately same dispersion property as that of the turbid medium.

10. An apparatus of inner light layer illumination for optical imaging in turbid media, the apparatus comprising:
    a laser for generating short light pulse(s); and
    a negative dispersion generation means for broadening width of said short light pulse(s); and
    an inner light layer creation means for sending said short light pulse(s) into said turbid medium after said width broadening of said short light pulse(s) to form an inner light layer in said turbid medium to illuminate the object; and
    an imaging distance adjusting means for adjusting the distance of said optical imaging in said forbid medium; and
    an optical receiver receiving signal light pulse(s) reflected from said object in the turbid medium,
    wherein said turbid media include human body, animal body, seawater, river water, lake water, pond water, fog, smog, snow, ice, and
    wherein said short light pulse contains N components with different angular frequencies $\omega_j$ (j=0, 1, 2, 3, ..., N−1), N is from 3 to $10^{12}$.

* * * * *